United States Patent Office 3,787,581
Patented Jan. 22, 1974

3,787,581
PHARMACEUTICAL COMPOSITIONS AND
METHODS OF TREATMENT
Merton Sandler, 10 Kilmorey Road, East Twickenham,
Middlesex, England
No Drawing. Filed Mar. 22, 1971, Ser. No. 127,017
Claims priority, application Great Britain, Mar. 24, 1970,
14,365/70; July 28, 1970, 36,430/70
Int. Cl. A61k 27/00
U.S. Cl. 424—319
9 Claims

ABSTRACT OF THE DISCLOSURE m-Tyrosine and other compounds of the formula m-HO.$C_6H_4$.$CH_2$.$CHR_1$.NHR where R is H or alkoxycarbonyl and $R_1$ is H, COOH or COOAlkyl are advanced for the treatment of depression, alone or concomitantly with dopa or other catecholic analogues of the foregoing compunds. Pharmaceutical compositions containing both types of compound are described, as is also the treatment of Parkinsonism using the two types of compound concomitantly.

The present invention concerns pharmaceutical compositions and methods of treatment.

The invention relates in a first aspect to a method for the treatment of depression in persons suffering from this condition, particularly retarded depressed patients. Whilst the pathogenesis of this disease group is in general terms unknown, the compositions according to the invention are particularly intended for inclusion in the choice of chemotherapeutic treatments for those patients of this disease group with a low level of homovanillic acid in the cerebrospinal fluid, and for those subjects whose depressive illness is a consequence of treatment with certain other drugs, particularly reserpine and other compounds with a similar depressive action.

It is also an object of the present invention to provide a pharmaceutical composition which will provide improved alleviation of symptoms in at least a proportion of patients suffering from depression.

According to the first aspect of the present invention, there is provided a method of treating a patient having depression which comprises administering an amount effective to ameliorate depression of at least one compound of the formula:

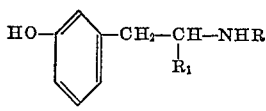

or a pharmaceutically acceptable salt thereof, in which formula R is hydrogen or alkoxycarbonyl and $R_1$ is hydrogen or $COOR_2$ wherein $R_2$ is hydrogen or alkyl, at least one of R and $R_1$ not being hydrogen. When $R_1$ is not hydrogen, the compound is preferably in the form of its L-isomer. A preferred compound of Formula I is m-tyrosine, particularly L,m-tyrosine.

According to a second aspect of the present invention, there is provided a method of treating depression which comprises administering a compound of the Formula I above or a pharmaceutically acceptable salt thereof and concomitantly administering a compound of the formula:

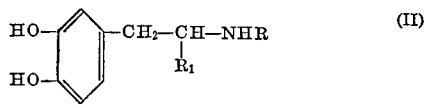

or a pharmaceutically acceptable salt thereof, in which formula R and $R_1$ have the same meanings as those defined in relation to Formula I. A particularly preferred compound according to Formula II is L-dopa, i.e. L-3-(3,4-dihydroxyphenyl)alanine. The amounts of the compounds of Formula I and Formula II are so chosen as to produce an antidepression effect. The concomitant use of the Formula II compounds appears to lead to a synergistic effect.

The compounds of Formulae I and II may be administered together and, for the latter purpose, the present invention also provides a pharmaceutical composition comprising in association a compound of Formula I or a pharmaceutically acceptable salt thereof and a compound of Formula II or a pharmaceutically acceptable salt thereof, normally together also with a pharmaceutically acceptable carrier therefor.

In the aforementioned Formulae I and II, the term "alkyl" is used as meaning straight and branched chain alkyl groups of 1 to 6, (preferably 1 to 4) carbon atoms, such as methyl, ethyl, propyl, isopropyl, n.butyl, s.butyl, i.butyl, t-butyl, s-amyl, t-amyl, n-hexyl and s-hexyl. The term "alkoxy" in this specification is to be construed correspondingly.

Preferred compounds of Formulae I and II are those wherein R is hydrogen and $R_1$ is COOH.

The compounds of Formulae I and II in which R is alkoxycarbonyl are novel compounds. They are generally more easily absorbed and/or produce fewer side effects than the free amine. They may readily be prepared by reaction of the free amine with the corresponding alkyl chloroformate. The compounds of Formula I in which $R_1$ is $COOR_2$ and $R_2$ is alkyl are also novel compounds and they are readily prepared by esterification of the L-isomer of the free acid using, for example, the corresponding alkanol or alkyl halide.

When $R_1$ is Formulae I and II represents $COOR_2$ and $R_2$ is hydrogen, the pharmaceutically acceptable salts include basic salts and ion-exchange resin salts. When R in Formulae I and II is hydrogen, the pharmaceutically acceptable salts include acid addition salts and ion exchange resin salts.

Acid addition salts comprise especially pharmaceutically acceptable non-toxic addition salts with suitable acids, such as those with inorganic acids, for example hydrochloric, hydrobromic, nitric, sulphuric or phosphoric acids, or with organic acids, such as organic carboxylic acids, for example acetic, glycollic, maleic, tartaric, citric, o-acetyloxy-benzoic, nicotinic or isonicotinic acid, or organic sulphonic acids, for example methane sulphonic, ethane sulphonic, 2-hydroxyethane sulphonic, p-toluene sulphonic or naphthalene 2-sulphonic acid.

A resulting acid addition salt may be converted into the free compound according to known methods, for example, by treating it with a base such as with a metal hydroxide, for example an alkali metal or alkaline earth metal hydroxide, for example lithium hydroxide, sodium hydroxide, potassium hydroxide, or calcium hydroxide; a metal carbonate, such as an alkali metal or an alkaline earth metal carbonate or hydrogen carbonate, for example sodium, potassium or calcium carbonate or hydrogen carbonate; ammonia; with a hydroxyl ion exchange preparation or with any other suitable reagent.

A resulting acid addition salt may also be converted into another acid addition salt according to known methods; for example, a salt with an inorganic acid may be treated with a metal salt, for example sodium, barium, or silver salt, of an acid in a suitable diluent, in which a resutling inorganic salt is insoluble and is thus removed from the reaction medium. An acid addition salt may also be converted into another acid addition salt by treatment with an anion exchange preparation.

A free compound may be converted into an acid addition salt according to known methods, for example, by reacting the compound, preferably a solution thereof in a solvent or solvent mixture, with the appropriate acid or a solution thereof, or with an anion exchange preparation and isolating the desired salt, which may be obtained in form of a hydrate or may contain solvent of crystallization.

Resin salts of the compounds of Formulae I and II in which R is hydrogen, that is to say salts in which the base is ionically bonded to an ion exchange material, may be obtained by contacting a cation exchange material with a solution in an inert, preferably polar, solvent of the base until the desired degree of saturation, usually substantially complete saturation, of the exchange material with the base has taken place. Suitable cationic exchange resins for this purpose are Zeocarb 225H, Dowex 50W–X8, Amberlite IR 120(H), Zeocarb 226H and Amberlite IRC 50(H) (the words "Dowex," "Amberlite" and "Zeocarb" being registered trademarks in the United Kingdom).

The compounds of Formulae I and II wherein $R_1$ is COOH may be converted into basic salts according to known methods, for example, by reacting the acid preferably a solution thereof in a solvent or solvent mixture, with the appropriate base or a solution thereof, or with an anionic exchange preparation and isolating the desired salt, which may be obtained in the form of a hydrate or may contain solvent of crystallization.

Salts of the free acid of Formula I comprise especially the pharmaceutically acceptable, non-toxic salts with suitable bases, such as those with a hydroxide, for example ammonium hydroxide or an alkyl ammonium, aralkylammonium, alkali metal or alkaline earth methal hydroxide, for example, lithium hydroxide, sodium hydroxide, potassium hydroxide, calcium hydroxide, benzyltrimethyl ammonium hydroxide, tetramethylammonium hydroxide, tetraethylammonium hydroxide, tetrabutylammonium hydroxide or choline hydroxide; with a carbonate, such as an alkali metal or an alkaline earth metal carbonate or hydrogen carbonate, for example, sodium, potassium, or calcium carbonate or hydrogen carbonate; or with a hydroxyl ion exchange preparation, or with any other suitable reagent.

Resin salts of the free acids of Formulae I and II may be obtained by contacting an anion exchange material with a solution in an inert, preferably polar, solvent of the acid until the desired degree of saturation, usually substantially complete saturation, of the exchange material with the acid has taken place. Suitable anion exchange resins for this purpose are the hydroxy forms of those known by the trade name De Acidite FF, Amberlite IRO–400, Dowex 1 and Dowex 2 (the word "De Acidite" being a registered trademark in the United Kingdom).

In the method of the present invention the compositions may be administered orally, parenterally or rectally in the form of, for example, tablets, capsules, suppositories, solutions or suspensions. The compounds of Formula I may be administered either alone or together with those of Formula II, as previously mentioned. In this event, a daily dose may be 4–8 g. per day of L-dopa together with up to 6 g. per day of DL,m-tyrosine or up to 3 g. per day of L,m-tyrosine, the dosage of m-tyrosine usually being increased, within this range, during a course of treatment.

The medicament is suitably administered in a dosage unit form. The expression "dosage unit form" is used as meaning a physically discrete unit containing an individual quantity of the active ingredient or ingredients, generally in admixture with a pharmaceutical diluent therefor or otherwise in association with a pharmaceutical carrier, the quantity of the active ingredient or ingredients being such that one or more units are normally required for a single therapeutic administration or that, in the case of severable units such as scored tablets, at least one fraction such as a half or quarter of a severable unit is required for a single therapeutic administration. A dosage unit may contain, for example, from 10 to 1000 mg. of at least one compound of Formula I and if desired (in accordance with the composition aspect of the present invention), from 10 to 1000 mg. of at least one compound of Formula II.

The formulations of the present invention normally will consist of at least one compound of Formula I and at least one compound of Formula II mixed with a carrier, or diluted by a carrier, or enclosed or encapsulated by a carrier in the form of a capsule, sachet, cachet, paper or other container. A carrier or diluent may be a solid, semi-solid or liquid material which serves as a vehicle, excipient or medium for the active therapeutic substance or substances. Some examples of the diluents or carriers which may be employed in the pharmaceutical formulations of the present invention are lactose, dextrose, sucrose, sorbitol, mannitol, starch, gum acacia, calcium phosphate, liquid paraffin, cocoa butter, oil of theobroma, alginates, tragacanth, gelatin, syrup B.P., methyl cellulose, polyoxyethylene sorbitan monolaurate, and methyl- and propylhydroxyl-benzoate. In the case of tablets, a lubricant may be incorporated to prevent sticking and binding of the powdered ingredients in the dies and on the punch of the tabletting machine. For such purpose, there may be employed for instance talc, aluminium, magnesium or calcium stearate or mineral oil.

The compound of Formula II when R is hydrogen and $R_1$ is COOH is that known as dopa, i.e. 3-(3,4-dihydroxyphenyl)alanine. It is known that certain patients suffering from Parkison's disease can have their condition alleviated by the administration of L-dopa. However, this treatment does not appear to be effective for all Parkinsonism sufferers, and even with those patients who are helped, relief may not occur for a substantial period of time after treatment with L-dopa is commenced, and/or relief may only be obtained at dose levels so high as to produce undesirable side effects. The present invention in a further aspect has as an object to provide a method of treatment which renders the use of dopa more effective in the treatment of Parkinsonism in terms of speed of onset of action and/or reduction of side effects and/or reduction of dopa dosage.

Accordingly, the present invention provides a method for the treatment of Parkinsonism comprising the administration concomitantly of at least one compound of Formula I above (or a pharmaceutically acceptable salt thereof) and at least one compound of Formula II (or a pharmaceutically acceptable salt thereof) in an amount together effective to ameliorate Parkinsonism. Conveniently the method is carried out employing the combination product of the present invention.

The use of compounds of Formulae I and II concomitantly appears to lead to a synergistic effect.

It will be appreciated that the dosage regime established for any given patient will be determined by that patient's response to the anti-depressive treatment or anti-Parkinsonism (as the case may be) of the present invention. However, it can be said that treatment with both a compound of Formula I and a compound of Formula II may involve a combined total dosage of from 10 to 100 mg./kg. per day being administered but, more usually, a total dosage of from about 5 to 75 mg./kg. per day will be used, the ratio by weight of compound of Formula II to compound of Formula I being from about 10:1 to 1:5.

The treatment of depression with a compound of Formula I alone, on the other hand, will normally involve administration of from 10 to 100 mg./kg. per day of a compound of Formula I.

The following examples further illustrate the present invention or compositions for use in the method aspect of the invention:

EXAMPLE 1

Tablets each having the following composition were made as follows:

| | Mg. |
|---|---|
| L-3-(3-hydroxyphenyl)alanine | 500 |
| Dried maize starch | 100 |
| Talc | 25 |
| Sodium lauryl sulphate | 2 |
| Calcium sodium alginate | 14 |
| Aluminium stearate | 1 |

A starch paste (1 in 10) was prepared from a portion of the starch (20 mg. per tablet) and water.

The L-3-(3-hydroxyphenyl)alanine and the balance of the starch were passed through a B.S. No. 20 sieve and mixed. The mixed powders were massed with the starch paste and the mass granulated. The granules were dried, sieved and mixed with the remainder of the ingredients. This mixture was compressed into tablets.

Three of such tablets administered 3 times per day provide relief from or a reduction of depression in at least a proportion of patients suffering from depression.

EXAMPLE 2

Capsules were prepared by mixing 300 mg. of N-ethoxycarbonyl-m-hydroxyphenethylamine and 25 mg. lactose and filling the mixture into gelatin capsules. A regime of two capsules 4 times per day controlled depression.

EXAMPLE 3

Tablets having similar action to those of Example 1 were prepared by using the ethyl ester of L-3-(3-hydroxyphenyl)alanine instead of the free acid.

EXAMPLE 4

Capsules were prepared as in Example 2 except that the active ingredients were 250 mg. of L-dopa and 250 mg. of L-3-(3-hydroxyphenyl)alanine. Three capsules administered 3 times per day produced in some patients a rapid anti-depressive action without deleterious side effects.

EXAMPLE 5

Tablets were prepared as in Example 1 except that the active ingredients were 300 mg. of N-ethoxycarbonyl-3,4-dihydroxyphenethylamine and 200 mg. of L-3-(3-hydroxyphenyl)alanine. Two tablets 4 times per day rapidly reduce depression in at least a proportion of cases of depression.

EXAMPLE 6

Tablets having similar action to those of Example 5 were prepared by using the ethyl ester of L-3-(3-hydroxyphenyl)alanine instead of the free acid.

The formulations of Examples 4, 5 and 6 may also be used in my method for the treatment of Parkinsonism.

Having regard to the foregoing disclosure, the following is claimed as the inventive and patentable embodiments thereof:

1. A method of treating a patient having depression which comprises administering to a patient an amount effective to ameliorate depression within the range from about 10 to about 100 mg. per kg. of a compound selected from those having the formula:

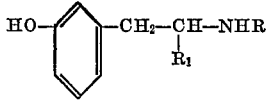

and pharmaceutically acceptable salts thereof, R in said formula representing hydrogen or alkoxycarbonyl, and $R_1$ representing hydrogen, or $COOR_2$ wherein $R_2$ is hydrogen or alkyl, at least one of R and $R_1$ being other than hydrogen.

2. A method according to claim 1, wherein m-tyrosine is administered.

3. A method according to claim 2, wherein L,m-tyrosine is administered.

4. A method according to claim 1, wherein there is concomitantly administered to the patient a compound selected from those having the formula:

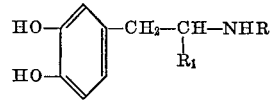

and pharmaceutically acceptable salts thereof, R in said formula representing hydrogen or alkoxycarbonyl and $R_1$ representing hydrogen or $COOR_2$ wherein $R_2$ is hydrogen or alkyl, at least one of R and $R_1$ being other than hydrogen, the total dosage of both compounds being within the range from about 10 to about 100 mg. per kg. and the ratio of the above compound to the compound of claim 1 being from about 10:1 to about 1:5.

5. A method according to claim 4, wherein L-dopa is concomitantly administered.

6. A method according to claim 5, wherein from 4 to 8 g. per day of L-dopa and up to 3 g. per day of L,m-tyrosine is administered.

7. A pharmaceutical composition for use in treating a patient having depression or Parkinson's disease, comprising from about 10 to about 1000 parts by weight of a compound selected from those having the formula:

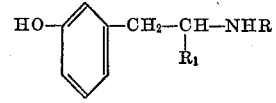

and pharmaceutically acceptable salts thereof, R in said formula representing hydrogen or alkoxycarbonyl, the alkoxy having from one to about six carbon atoms, and $R_1$ representing hydrogen or $COOR_2$ wherein $R_2$ is hydrogen or alkyl having from one to about six carbon atoms, at least one of R and $R_1$ being other than hydrogen, in association with from about 10 to about 1000 parts by weight of a compound selected from those having the formula:

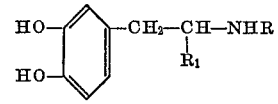

and pharmaceutically acceptable salts thereof, R in said formula representing hydrogen or alkoxycarbonyl, the alkoxy having from one to about six carbon atoms, and $R_1$ representing hydrogen or $COOR_2$ wherein $R_2$ is hydrogen or alkyl having from one to about six carbon atoms, at least one of R and $R_1$ being other than hydrogen.

8. A composition according to claim 7, wherein the ratio by weight of the second compound to the first compound is between 10:1 and 1:5.

9. A composition according to claim 7 in dosage unit form, each dosage unit containing from 10 to 1000 mg. of the first compound and from 10 to 1000 mg. of the second compound.

References Cited

UNITED STATES PATENTS

| 3,658,968 | 4/1972 | Lotti | 424—317 |
| 3,646,213 | 2/1972 | Bartholini et al. | 424—319 |

OTHER REFERENCES

Chem. Abst. 54, 19968a (1960).
Chem. Abst. 55, 2764a (1961).

STANLEY J. FRIEDMAN, Primary Examiner

U.S. Cl. X.R.

424—309, 330